Dec. 1, 1953

D. H. MILLS ET AL 2,661,216

PHONOGRAPH RECORD CHANGER

Filed June 17, 1947

2 Sheets-Sheet 1

Inventor
Donald H. Mills
Arthur L. Knox by Clarence J. Loftus Atty.

PHONOGRAPH RECORD CHANGER

Filed June 17, 1947 2 Sheets-Sheet 2

Inventor
Donald H. Mills
Arthur L. Knox.
By. Clarence J. Loftus atty.

Patented Dec. 1, 1953 2,661,216

UNITED STATES PATENT OFFICE 2,661,216

PHONOGRAPH RECORD CHANGER

Donald H. Mills and Arthur L. Knox, Fort Wayne, Ind., assignors to The Magnavox Company, Fort Wayne, Ind., a corporation of Delaware Application June 17, 1947, Serial No. 755,042

4 Claims. (Cl. 274—10)

The present invention relates to an improvement in phonograph record changers, and more particularly to a record stack supporting and selecting mechanism for accommodating stacks of records of different diameters.

In certain types of phonograph record changers now in use, the record changers will play ten twelve inch records or twelve ten inch records at a time. Such record changers are provided with supporting means for a stack of records which must be adjusted to accommodate the particular diameter of records being played. In one type of record changer a central spindle is provided with an offset portion or shoulder which supports the record at the center, and a cooperating shelf supports the record at the outer periphery. The supporting shelf is so formed that by raising the shelf slightly, the shelf may be rotated through 180° in order to change the position of the shelf in accordance with the change in the diameter of the records to be played. Any record supporting arrangement which necessitates an adjustment of the supporting means in accordance with different diameter records is frequently found to be objectionable in that the operator forgets to make the adjustment for assembling a stack of records and attempting to place the records on the central pin. When this happens it is necessary to set down the records, make the adjustment and then again align the records and place them on the spindle and the supporting shelf. It therefore would be desirable to provide an improved record changer which would not require an adjusting operation prior to placing the record on the spindle.

In accordance with the present invention the operation of the phonograph record changer is greatly simplified by providing a supporting means for the peripheral portions of a stack of phonograph records which is biased toward the spindle. The engagement of the phonograph record with the supporting means automatically positions the supporting means at the proper distance from the spindle in accordance with the diameter of the records to be played. Cooperating means then may be provided for indexing the tone arm or pick-up so that it will start at the outer groove of the phonograph record.

It therefore is an object of the present invention to provide an improved phonograph record changer.

It is a further object of the present invention to provide an improved phonograph record changer which does not require any adjustment in accordance with different diameter phonograph records to be played.

Other and further objects of this present invention subsequently will become apparent by reference to the following description taken in conjunction with the accompanying drawings wherein.

Figure 1:
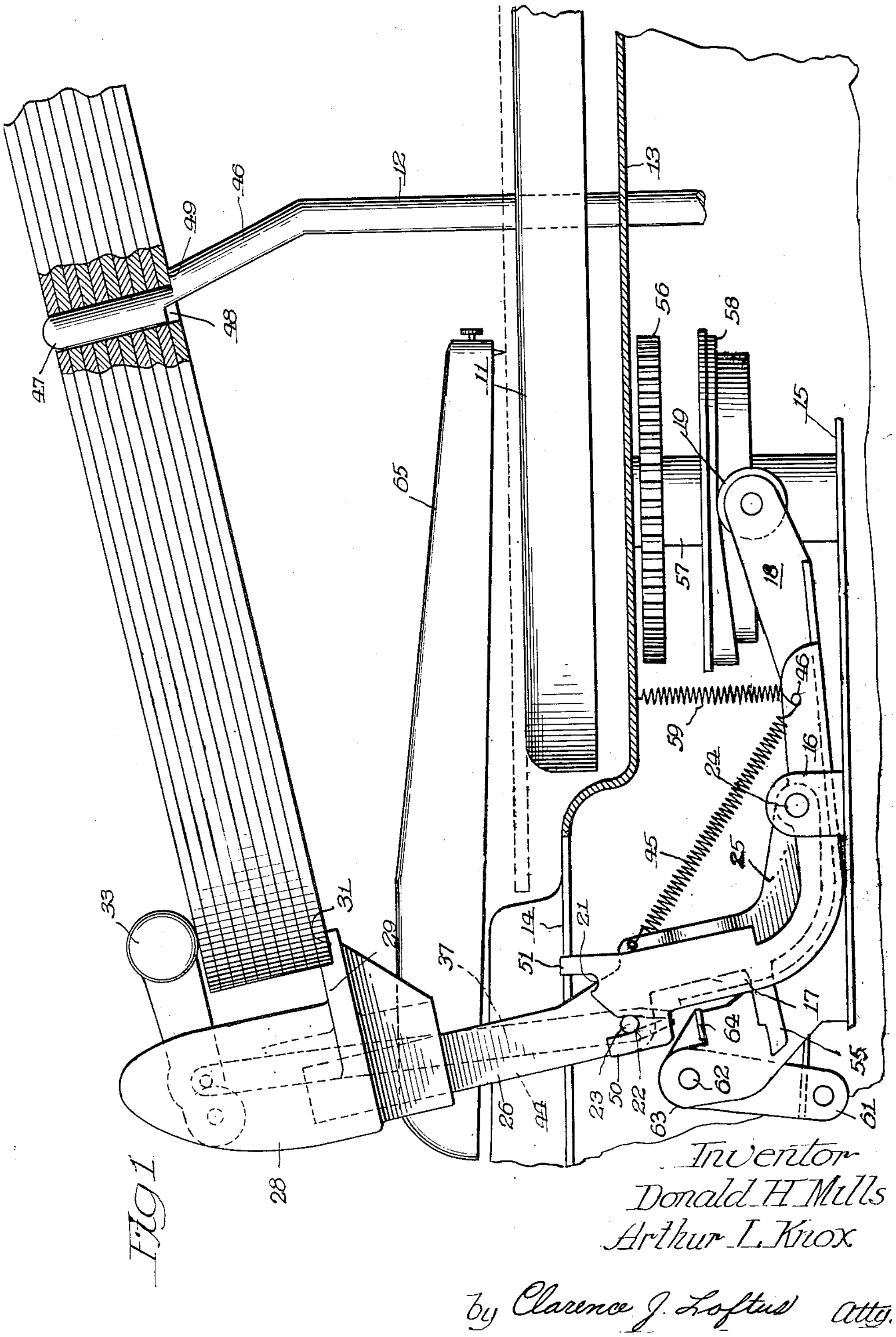
Figure 1 is a side view illustrating the operation of the invention when a stack of twelve inch phonograph records is employed.

Referring to the drawings it will be seen that there has been shown a turntable 11 which may be of the rim drive type provided with a suitable bearing which surrounds a record spindle 12. The record spindle 12 is supported in any suitable manner, and extends down through a cover plate 13 which is shown in Figure 1. The cover plate 13 has an opening 14. Some distance beneath the cover plate 13 there is provided a support plate 15 which carries a pair of ears or brackets 16 for pivotally supporting an actuating arm 17. The arm 17 is of channel-like configuration having an extension portion 18 which carries at its outer extremity a cam follower roller 19. The cam follower roller 19 is actuated by a suitable sequence operation mechanism not shown, since such mechanism may be of any suitable construction. The present invention is applicable to different types of sequence operation mechanisms and hence the drawings do not show such mechanism.

The actuating arm 17 at its other extremity is provided with two notches 21 and 22 and stops 50 and 51 which are adapted to be engaged by a pin 23. From Figure 3 it will be noted that the pin 23 engages either the pair of notches 21 or the pair of notches 22 formed in the channel-like actuating member 17. The channel-like actuating member 17 may be expanded or widened adjacent to the bottom to provide greater stability at its pivotal point where it is journalled on a pin 24, which passes through the ears of brackets 16. The pin 24 also passes through one extremity of a vertical support member 25 which is formed of two similar stamped metal members 26 which are fastened or welded together adjacent to bottom where they engage the pin 24. Each of the members 26 is provided with an elongated aperture 27 for receiving the pin 23. The members 26 extend upwardly into suitable recesses in a supporting head 23 which is provided with a shelf 29 having a stepped portion 31. The stepped portion 31 serves to support the outer periphery of a stack of phonograph records. The support member 28 has an upper bifurcated portion 32 for carrying a pressure pad 33.

The pressure pad 33 is provided with a pair of support pins 34 which are journalled in a suitable pair of bearing portions 35 in the bifurcated extremity 32 of the support 28. The pressure pad 33 adjacent pivotal support point is provided with a recess 36 for receiving a lever 37 which is secured in position by a support pin 38. The lever 37 extends down through an aperture or opening 39 in support head 28 so that the lower extremity of the lever 37 engages the reduced diameter portion 41 of the pin 23. The lower extremity of the lever 37 is bifurcated by a slot 42 so that the lever 37 together with two spacers 52 in effect serve to center the pin 23. Slot 42 is pinched together at the ends into pin groove 41, thereby fixing lever 37 to pin 23. The lever 37 is provided at an intermediate point with an apertured ear 43 to which is secured a spring 44 which is secured to an intermediate portion of one of the members 26.

When the pressure pad 33 is raised the pin 23 is pulled upwardly so that the pin 23 clears notches 21 or 22 and remains within the limits of stops 50 and 51. This unlocks the support bracket 25 from arm 17. The support on 25 is biased in a clockwise direction as shown in the drawing by a spring 45 which has one extremity secured to a suitable point 46 which is carried by the arm 17. The pressure pad 33 is raised and moved to an over-center vertical position whenever it is desired to place a stack of records on the spindle 12.

The spindle 12 is provided with a bent portion 46 which is connected to an offset portion 47. At the lower extremity of the offset portion 47 there is formed a step 48. On the opposite side of the bent portion 46 there is formed a shoulder 49 which is spaced from the step 48 by an amount corresponding to the average thickness of a phonograph record. The step 31 of the support shelf 29 likewise is spaced a distance equal to the average thickness of a phonograph record.

The phonograph shown in the drawing has a sequence operation mechanism which may be of any suitable type and which in of itself does not involve invention. A portion of the sequence operation mechanism, however, is illustrated in Figure 1 from which it will be seen that there has been shown a gear 56 mounted on a shaft 57 which also carries a cam 58. The cam 58 engages the cam roller 19 mounted on the outer extremity of the arm 18. The arm 18 is biased upwardly against the cam surface 58 by a spring 59 connected to the arm 18 and to the under side of the cover plate 13. The sequence operation mechanism also includes a lever 61, pivotally mounted at 62 on a support bracket 63. Connected to the pivotal connection 62 which carries the arm 61, is a lever having a projection 64 arranged to be engaged with the projecting arm 55 of the bracket 26 when the apparatus is in the position shown in Figure 2. The engagement of the projection 55 with the arm 64 changes the indexing of the phonograph pickup arm 65 for reproduction of the ten inch phonograph record. It therefore, is apparent that the shifting of the position of the support 28 from the position shown in Figure 1 to that shown in Figure 2 has a control effect upon a sequence operation mechanism to produce proper operation of the phonograph pickup 65 in accordance with the difference in the diameters of the records to be reproduced.

The operation of the present invention will become apparent now by assuming that there are no phonograph records on the offset portion 47 of the spindle 12. It furthermore will be assumed that it is desired to place a stack of twelve inch records on the record changer. The records normally are assembled in the order in which it is desired to play the selections. The pressure pad 33 is moved to a substantially vertical position whereupon the lever 37 is moved upwardly to raise the pin 23 out of the slot in arm 17 so that the spring 45 will move the support mechanism to a position substantially corresponding to that shown in Figure 2 or very slightly beyond in a clockwise direction. The stack of records is then grasped and the edge of the lowermost record is placed upon the support shelf 29. The support shelf 29 and supporting structure 28 is thereupon pushed in a counter-clockwise direction until the offset portion 47 of the spindle 12 passes through the aligned holes in the phonograph record. The records therefore will be resting upon the shelf 29 and upon the offset spindle 47, the lowermost record being supported by the shelf 49. The pressure pad 33 thereupon is returned to the position shown in Figure 1 whereupon it rests on the topmost phonograph record. The operation of the phonograph can now be initiated by pushing a suitable control button or knob so as to energize the turntable motor and the sequence operation mechanism.

The pressure pad 33 is lowered into position against the top of the record stack. This permits lever 37 to be pulled by spring 44 in a downward manner forcing locking pin 23 into notch 22. This forces the selector head assembly 25, 26 and 28 to assume the position shown in Figure 1. The spring 53 biases the pressure pad 33 toward the stack of records.

The sequence operation mechanism including the cam 58 actuates the arm 18 in such manner as to move the member 28 in a clockwise direction for a short distance so that all of the records except the bottom record again rest upon the shelf 29. This movement of the member 28 causes the lowermost record to be moved in a clockwise direction as seen in Figure 1, so that the righthand edge of the center hole of the lowermost phonograph record clears the shelf or step 49, whereupon the record slides down the bent or inclined portion 46 onto the vertical spindle 12.

The positioning of the tone arm for ten inch or twelve inch records is controlled by the motion of the support bracket 25 between the stops 50 and 51. The projecting arm 55 of the bracket 26 controls the position of the tone arm by controlling the cooperating mechanism which is engaged thereby for one diameter of the records. During the reproduction of a phonograph record the sequence operation mechanism is arrested or stopped until the phonograph record has been reproduced, and the pick-up arm has reached the inner eccentric circle of the phonograph record. When this occurs the sequence operation mechanism is again actuated to repeat the operation just described.

In the operation for twelve inch phonograph records the movement of the pressure pad 33 to the position shown in Figure 1 caused the lever 37 to move downwardly so as to bear against the pin 23, thereby to seat the pin in the pair of recesses 22. This therefore locks the member 25 in this position with respect to the actuating arm 17.

Figures 2, 3, 4:
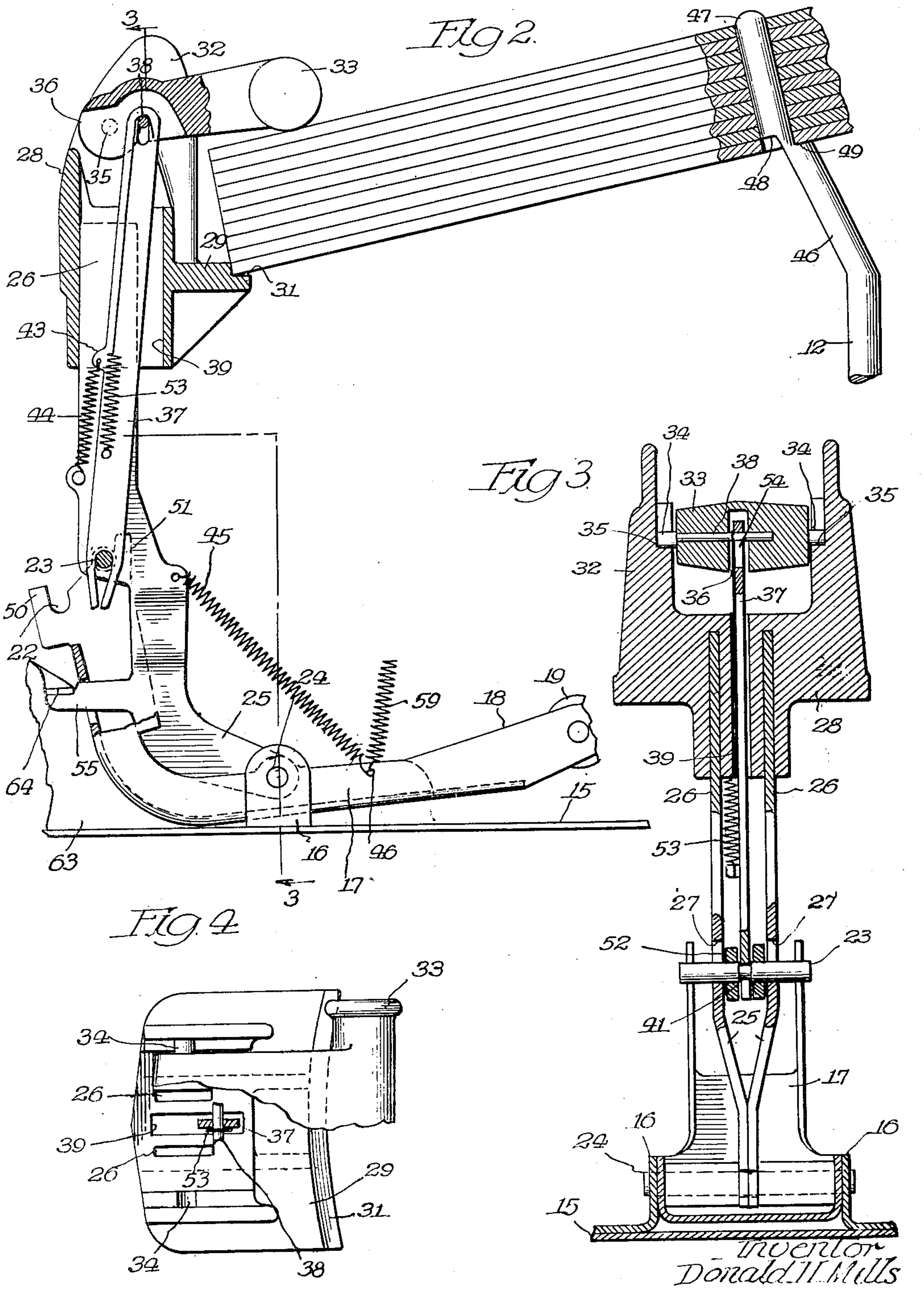
Figure 2 is a side view illustrating the operation of the invention when a stack of ten inch records is employed.
Figure 3 is a cross-sectional view as seen in the direction of the arrows along the line 3—3 of Figure 2.
Figure 4 is a top view partially broken away to show the construction of the support embodying the present invention.

The operation with respect to the playing of ten inch phonograph records is very similar to the operation for the twelve inch phonograph record except that the member 25 is locked in a different position corresponding to the one illustrated in Figure 2, and the projection 55 of the support 25 is in engagement with the lever member 64.

It now may be assumed that it is desired to place a stack of ten inch records on the record changer. The movement of the pressure pad 33 to a substantially vertical position permits the support member 28 to move to a position slightly beyond that illustrated in Figure 2 in a clockwise direction. A stack of records is arranged in the order in which it is desired to reproduce the selections. The records are then gathered together and placed upon the shelf 29 so as to move the support 28 in a counter-clockwise direction until the offset portion 47 of the spindle 12 passes through the holes in the record. Thereupon the pressure pad 33 is moved to the position shown in Figure 2. The placing of the records upon the shelf 29 and lowering the pressure pad into the position shown in Figure 2 causes the pin 23 to engage in a pair of slots or recesses 21 in the upper extremity of the channel arm 17 thus locking support arm 25 to arm 17 in its new position. The movement of the pressure pad 33 to the position shown in Figure 2 moves the lever 37 so that the pin 23 engages the notch 21 with a force supplied by the spring 44. Thus the support member 25 is locked in position relative to the member 17 as illustrated in Figure 2.

The operation of the record changer is then initiated by pressing the proper starting button whereupon the sequence operation mechanism will actuate the cam follower 19 so as to move the record supporting structure in a counter-clockwise direction for a short distance so that the lowermost record in the stack engages the shelf or step portion 31 of the support 28. Upon completion of this counter-clockwise movement, the sequence operation mechanism then moves the member 28 in a clockwise direction from the position shown in Figure 2 so as to move the lowermost record a sufficient distance that the hole in the record is aligned with the inclined bent portion 46 on the spindle 12. When this occurs the lowermost record is in condition to move down the inclined portion 46. Upon completion of the reproduction of the phonograph record, the sequence operation mechanism is again initiated to produce a clockwise and counter-clockwise movement of the support member 25 so as to release another record. This continues until the entire stack of records has been reproduced.

From the foregoing it will be appreciated that in accordance with the present invention there has been provided record changer mechanism which will support ten inch or twelve inch records without the necessity of performing an adjustment corresponding to the diameter of records to be played. The preparation of the record changer for playing records of any diameter is the same in all cases. It is only necessary to raise the pressure pad 33 in order to prepare the record changer for the reception and reproduction of either the ten inch or the twelve inch records. This eliminates the possibility of moving the support post or shelf to a position which is incorrect.

It further will be appreciated that the present invention is not limited to a particular type of record changer since any suitable sequence operation mechanism may be employed.

While for the purpose of illustrating and describing the present invention, a preferred embodiment has been illustrated in the drawings, it is to be understood that the invention is not to be limited thereby since such variations in the physical embodiment, and in the arrangement of the components thereof, are contemplated as may be commensurate with the spirit and scope of the invention set forth in the following claims.

What we desire to protect by United States Letters Patent is claimed as follows:

1. In a phonograph record changer, the combination comprising a record stack supporting spindle and a shiftable record periphery supporting shelf; means for advancing and retracting the shelf with respect to the spindle; said means comprising a power actuated shiftable operating member; means to bias the shelf toward the record supporting spindle, plural position latching means to adjust the position of the record shelf with respect to the shiftable operating member, a pressure pad shiftable between an operating position bearing against a record on the spindle and an inoperative position disengaged from the records, and means operatively associated with and responsive to movement of said pressure pad to its inoperative position to disengage the latching means.

2. In a phonograph record changer, the combination comprising a record stack supporting spindle and a shiftable record periphery supporting shelf; means for advancing and retracting the shelf with respect to the spindle; said means comprising a power actuated shiftable operating member; means to bias the shelf toward the record supporting spindle, plural position latching means to adjust the position of the record shelf with respect to the shiftable operating member, a latch release member shiftable between an operating position overhanging the record shelf and an inoperative position remote from said shelf, and means operatively associated with and responsive to movement of said latch release member to its inoperative position to disengage the latching means.

3. In a phonograph record changer, the combination comprising a record stack supporting spindle and a shiftable record periphery supporting shelf, means for shifting the shelf with respect to the spindle; said means comprising a power actuated shiftable operating member; plural position latching means to adjust the position of the record shelf with respect to the shiftable operating member, a pressure pad manually shiftable between an operating position bearing against a record on the spindle and an inoperative position disengaged from the records, and means operatively associated with and responsive to movement of said pressure pad to actuate the latching means.

4. In an automatic record changer, the combination comprising a record stack supporting spindle and a shiftable record periphery supporting shelf, means for shifting the shelf with respect to the spindle; said means comprising a power actuated shiftable operating member, means for adjustably connecting the record shelf to the shiftable operating member to adjust the position of the record shelf with respect to the shiftable operating member, a member carried by said shelf and adapted to be placed in engagement with the top record supported by said spindle and said shelf, and means connected between said member and said adjustable connecting means for actuating said adjusting means.

DONALD H. MILLS.
ARTHUR L. KNOX.

References Cited in the file of this patent

UNITED STATES PATENTS

| Number | Name | Date |
|---|---|---|
| 1,938,810 | Collison et al. | Dec. 12, 1933 |
| 2,271,001 | Fortune | Jan. 27, 1942 |
| 2,453,123 | Erwood | Nov. 9, 1948 |
| 2,536,432 | Faulkner | Jan. 2, 1951 |
| 2,564,455 | Stolberg | Aug. 14, 1951 |